(12) United States Patent  (10) Patent No.: US 7,555,478 B2
Bayley et al.  (45) Date of Patent: *Jun. 30, 2009

(54) SEARCH RESULTS PRESENTED AS VISUALLY ILLUSTRATIVE CONCEPTS

(75) Inventors: Oliver Bayley, Pacifica, CA (US); Liang-yu (Tom) Chi, San Francisco, CA (US); Samantha Marie Tripodi, San Francisco, CA (US); Karon A. Weber, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 11/635,451

(22) Filed: Dec. 5, 2006

(65) Prior Publication Data

US 2008/0133505 A1  Jun. 5, 2008

(51) Int. Cl.
*G06F 17/30* (2006.01)
*G06F 17/00* (2006.01)

(52) U.S. Cl. ........................ 707/3; 707/104.1
(58) Field of Classification Search ........................ None
See application file for complete search history.

(56) References Cited

U.S. PATENT DOCUMENTS

| 6,704,729 | B1 | 3/2004 | Klein et al. |
| 7,051,023 | B2 | 5/2006 | Kapur et al. |
| 2003/0130976 | A1* | 7/2003 | Au ............................. 706/55 |
| 2006/0106793 | A1* | 5/2006 | Liang ........................... 707/5 |
| 2007/0033221 | A1* | 2/2007 | Copperman et al. ...... 707/103 R |
| 2007/0130112 | A1* | 6/2007 | Lin ............................. 707/2 |

OTHER PUBLICATIONS

International Search Report and Written Opinion mailed on Feb. 29, 2008, for PCT Application No. PCT/US2007/085140 filed on Nov. 19, 2007, 13 pages.

* cited by examiner

*Primary Examiner*—Uyen T. Le
(74) *Attorney, Agent, or Firm*—Morrison & Foerster LLP

(57) ABSTRACT

A system and method for providing search results in visually illustrative concept format is disclosed. Concepts relating to a query term are identified. The search results comprise a conceptual search result entry for each identified concept. Each conceptual search result entry includes at least a visual content and textual content relating to its respective identified concept. The content for a given conceptual search result entry can come from different sources.

22 Claims, 8 Drawing Sheets

|  | Jaguar |  |
|---|---|---|
| My Web    Advance BETA    Search Services    Advanced Search    Preferences |

Also try: jaguar cars, jaguar animal, jaguar parts, jaguar pictures
More...

| | |
|---|---|
| SPONSOR RESULTS | SPONSOR RESULTS |
| • Pay Dealer Cost on a New Jaguar<br>www.whypaysticker.com  Save money. Why pay retail on a new Jaguar when our dealer network offers dealer cost? | Buy a New Jaguar below Invoice<br>Why pay sticker? You can buy a new car below invoice. Smart...<br>www.carsbelowinvoice.com |
| • Jaguar Luxury Automobile<br>www.jaguarusa.com  Official Site–Jaguar vehicle specs, pictures, options and pricing information on a new or certified pre-owned Jaguar luxury automobile. | Luxury Motors – Jaguar<br>Worldwide e-commerce luxury automobile retailer. All luxury makes,...<br>luxurymotors.com |
| New Jaguar Cars – Photos – 360 Tour –<br>Reviews – Free Price Quotes<br>Most popular: S–Type – XK–Series – XJ–Series<br>Yahoo! Shortcut – About | New Jaguars – Compare Dealer Prices<br>Get free, competitive quotes from Jaguar dealers in your area on a...<br>www.pricequotes.com |
| 1. Jaguar<br>Official site of the Ford Motor Company division Featuring new models and local dealer information.<br>Quick Links: X–Type – S–Type – XJ<br>www.jaguar.com  – More from this site – Save | Rare / Exotic Jaguars for Sale<br>Cruise onto ExoticTraderOnline.com to buy or sell your exotic car...<br>exotic.collectorcartraderonline.com |
| 2. Jaguar (Panthera onca)<br>Provides information on the largest cat of the Americas basic biology, population status, habitat, and more.<br>Category: Wild Cats > Jaguars<br>lynx.uio.no /catfolk onca-01.htm-4k-Cached- More from this alta - Save | Secret Jaguar Price Quotes<br>Secret car prices near or below invoice. Let Car Price Secrets...<br>www.carpricesecrets.com |
| 3. Jaguar: Lord of the Mayan Jungle<br>A multimedia expedition into the heart of the Mexican jungle, searching for the elusive jaguar.<br>Category: Wild Cats > Jaguars<br>www.oneworldjourneys.com /jaguar-33k-Cached-More from this site-Save | Jaguar Quotes<br>Our dealers are overstocked on all vehicles. Request a quote now...<br>www.newcars.com |
| 4. Jaguar: Mysterious cat of the Amazon<br>Compares jaguars and leopards and provides information about the animal's shrinking habitat and relationship with man.<br>Category: Wild Cats > Jaguars<br>www.bluelion.org /jaguar.htm-11k-Cached-More from this site-Save | Find Your Jaguar with AutoTrader.com<br>Over 2.7 million listings to search from. Search new, used, and...<br>www.autotrader.com |
| 5. Jag-lovers<br>Offers model pages, mailing lists, book reviews, and more for the Jaguar our enthusiest.<br>www.jag-lovers.org-33k-Cached-More from this site – Save | Save Money on a New Jaguar<br>Find a great deal on a new car today at Intellichoice.com. Get... |
| 6. Jaguar Enthusiasts' Club (JEC)<br>Offers information on activities. Based in the U.K. but offers memberships worldwide.<br>Category: United Kingdom  >  Jaguar>  Clubs and Organizations<br>www.jec.org.uk – 1k- Cached – More from this site – Save | See your message here... |

FROM FIG. 1A

7. Jaguar Clubs of North America (JCNA)
   For those dedicated to both the classic and contemporary cars. Provides information on the parent organization of the local clubs.
   www.jcna.com–25k–Cached – More from this site – Save 8. Jaguars.com >> The official website of the NFL's Jacksonville Jaguars.
   jaguars.com >>The official website of the NFL's Jacksonville Jaguars. ...
   Category: NFL > Jacksonville Jaguars
   RSS: View as XML – Add to my Yahoo!
   www.jaguars.com – More from this site – Save 9. Jaguar UK – Jaguar Cars
   From £19,995. From £19,996. From £27,995. From £27,995. From £41,995. From £41,996. From £58,955. From £58,956...
   Tools and Services. Finance. Owners. About Jaguar...Design Your Jaguar. Finance Your Jaguar. jaguar eNewsletter...
   www.Jaguar.co.uk– 21k– Cached– More from this site – Save 10. Jaguar US – home
    From $32,995. From $32,995. From $45,996. From $45,995. From $62,495. From $62, 496. From $70,495. From $70,495.
    Locate a Dealer... From $70, 495. Build Your Jaguar. Request a Brochure... Locate a Dealer. Finance Your Jaguar. Contact a Dealer...
    www.jaguar.com /us – 23k – Cached – More from this site– Save

SPONSOR RESULTS

- Buy a New Jaguar below Invoice
  www.carsbelowinvoice.com   Why pay sticker? You can buy a new car below invoice.

- Luxury Motors – Jaguar
  luxurymotors.com   Worldwide e-commerce luxury automobile retailer.

Also try: jaguar cars, jaguar animal, jaguar parts, jaguar pictures
More... ┌104

Results Page:
1 2 3 4 5 6 7 8 9 10 ▸ Next

FIG. 1B
PRIOR ART

SEARCH RESULTS PRESENTED AS VISUALLY ILLUSTRATIVE CONCEPTS

BACKGROUND OF THE INVENTION

The present invention relates to a computer-implemented system for presentation of information. More particularly, the present invention relates to presentation of search results.

Presently, the most common searches over the Internet are keyword searches. A user enters one or more terms into a search engine and the search engine returns search results. The search results comprise a list of items or locations (e.g., uniform resource locators (URLs) of web pages) that contain the search terms. The listing may also include a short excerpt from each items or location showing the presence of the search terms. FIGS. 1A-1B is an example of a portion of the search results provided in response to the search term "jaguar." Search results entries 100 are provided as a list of URLs with corresponding short excerpts.

Some search engines allow users to search for images. Referring to FIG. 2, an example of search results including images is shown. The search results comprise images with associated identifier information laid out in a grid format (in columns and rows). Each image (e.g., an image 200) has an image file name (e.g., a file name 202), size information (e.g., a size information 204), and source URL (e.g., an URL 206) as its associated identifier information. The associated identifier information is metadata provided with the image and/or is information provided by the URL's web page. In other words, each search results entry (e.g., the image 200, file name 202, size information 204, and URL 206) comes from the same source (e.g., the web page associated with the URL 206). If the user clicked on the URL 206, the user would see that the image 200 is contained in the web page associated with the URL 206.

Another way that search results can include images is in the context of shopping websites. When the user enters keywords or otherwise specifies products, a list or grid of desired products is displayed. Each displayed product can include an image of the product and associated information such as the price and product description. However, similar to the search results of FIG. 2, each search results entry is an image and its associated information (e.g., metadata) that are already tied to each other. The image of a given product would not be presented with information about a different product.

Even though search results can be displayed in a number of different ways, the returned search results is often large. The large number of search result entries makes it difficult for the user to reasonably look through the results. Depending on factors such as the ordering of the search results entries, the broadness of the search terms, and the total number of search results entries, the particular entry or item that the user is actually looking for may exist on the fifth, tenth, or later pages of the search results. In some cases, what the user is looking for may not even be within the returned search results. Even with sophisticated searching algorithms or ranking algorithms, it is often not possible to predict what each user is actually looking for and to reduce the number of search result entries accordingly.

Including images in search results can facilitate quicker review of the search results. However, the current use and value of displaying images along with textual information is limited, because the textual information presented with a given image is merely information that is already tied to the image. In other words, the images are in effect merely a kind of "short excerpt." The number of search result entries is not reduced by including images in the search results. Each search results entry is still configured from a single source (e.g., the URL's web page and any metadata associated with the web page). The user still has to scroll and skim through the search results to locate his relevant content.

Thus, it would be beneficial to provide search results categorized or clustered by different concepts. It would be beneficial to abstract and compress the search results into a readily comprehensible form. It would be beneficial to present multi-media content in search results. It would be beneficial to present textual and non-textual information in search results, where the display configuration of the textual and non-textual information are determined on-the-fly. It would be beneficial to present search results in one or more layouts or templates determined on-the-fly. It would be beneficial to provide focused advertisements based on conceptual sorting or grouping of the search results.

BRIEF SUMMARY OF THE INVENTION

One aspect of the invention relates to a computer-implemented method for providing search results. The method includes receiving a query term and determining contextual usages of the query term. The method also includes providing as the search result a search results entry for each of the determined contextual usages.

Another aspect of the invention relates to a computer program product comprising computer-executable code for generating conceptual search results to a client device. The computer program product includes code for receiving a search parameter, and determining at least one concept associated with the search parameter. A conceptual based search result entry is generated for the determined concept. The conceptual based search result entry comprises indicia representative of the determined concept to facilitate rapid disambiguation.

Another aspect of the invention relates to a computer program product comprising computer-executable code for facilitating user disambiguation of search results. The computer program product includes dynamically identifying at least one common concept in search result entries obtained by relevancy correlation to at least a portion of a query term, and dynamically grouping the search result entries according to each identified common concept. The computer program product also includes identifying a portion of content provided in each of the grouped search result entries, and dynamically constructing a conceptual search result entry for each of the grouped search result entries. Each of the conceptual search result entries includes the portion of content from its respective grouped search result entries.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined by the claims attached hereto.

BRIEF DESCRIPTION OF THE DRAWINGS

The exemplary embodiments will become more fully understood from the following detailed description, taken in conjunction with the accompanying drawings, wherein the reference numeral denote similar elements, in which:

FIGS. 1A-1B is an example of a search results page.

Figure 2:
FIG. 2 is an example of a search results page including images.

In the drawings, to easily identify the discussion of any particular element or art, the most significant digit or digits in a reference number refer to the figure number in which that element is first introduced (e.g., element 1104 is first introduced and discussed with respect to FIG. 11).

The headings provided herein are for convenience only and do not necessarily affect the scope or meaning of the claimed invention.

DETAILED DESCRIPTION OF THE PREFERRED EMBODIMENTS

Described in detail below is a system and method for providing search results organized by different concepts. The search result entries are collapsed and presented as multi-modal, multi-media content for each of the identified concepts for a specified search term. The multi-modal, multi-media content configured for each identified concept is obtained from one or more sources. The concepts can be common/majority and minority concepts in accordance with the search term. Determination of the concepts, selection of the display content, selection of the sources from which to obtain the content, and/or selection of the layouts or templates for displaying the content is performed dynamically in response to a user's search request. Pre-determined relationship or association between the concepts, display content, sources, or templates may not be required. In one embodiment, the concept based search results are configured to facilitate rapid disambiguation more than interactivity. In another embodiment, the concept based search results are configured to facilitate interactivity over rapid disambiguation. In still another embodiment, the concept based search results are configured to facilitate both.

Rather than displaying all items that contain one or more of the search terms (or in accordance with the requisite search algorithm), which typically results in a large number of search results entries, all of the possible items satisfying the requisite search criteria are processed for selective display grouped by visually illustrating concepts. The large number of search results entries are presented as a handful of search results concepts (or however many concepts are identified for that search results). Each of the search results concept entry includes at least multi-media content for rapid review of the search results and descriptive text for rapid confirmation of proper identification of the desired concept. Presentation of visually illustrating concepts facilitates rapid disambiguation of the search results, one-step grouping of content relating to each identified concept, and/or interactivity among the various content provided for each identified concept.

The following description provides specific details for a thorough understanding of, and enabling description for, embodiments of the invention. However, one skilled in the art will understand that the invention may be practiced without these details. In other instances, well-known structures and functions have not been shown or described in detail to avoid unnecessarily obscuring the description of the embodiments of the invention.

Figure 3:
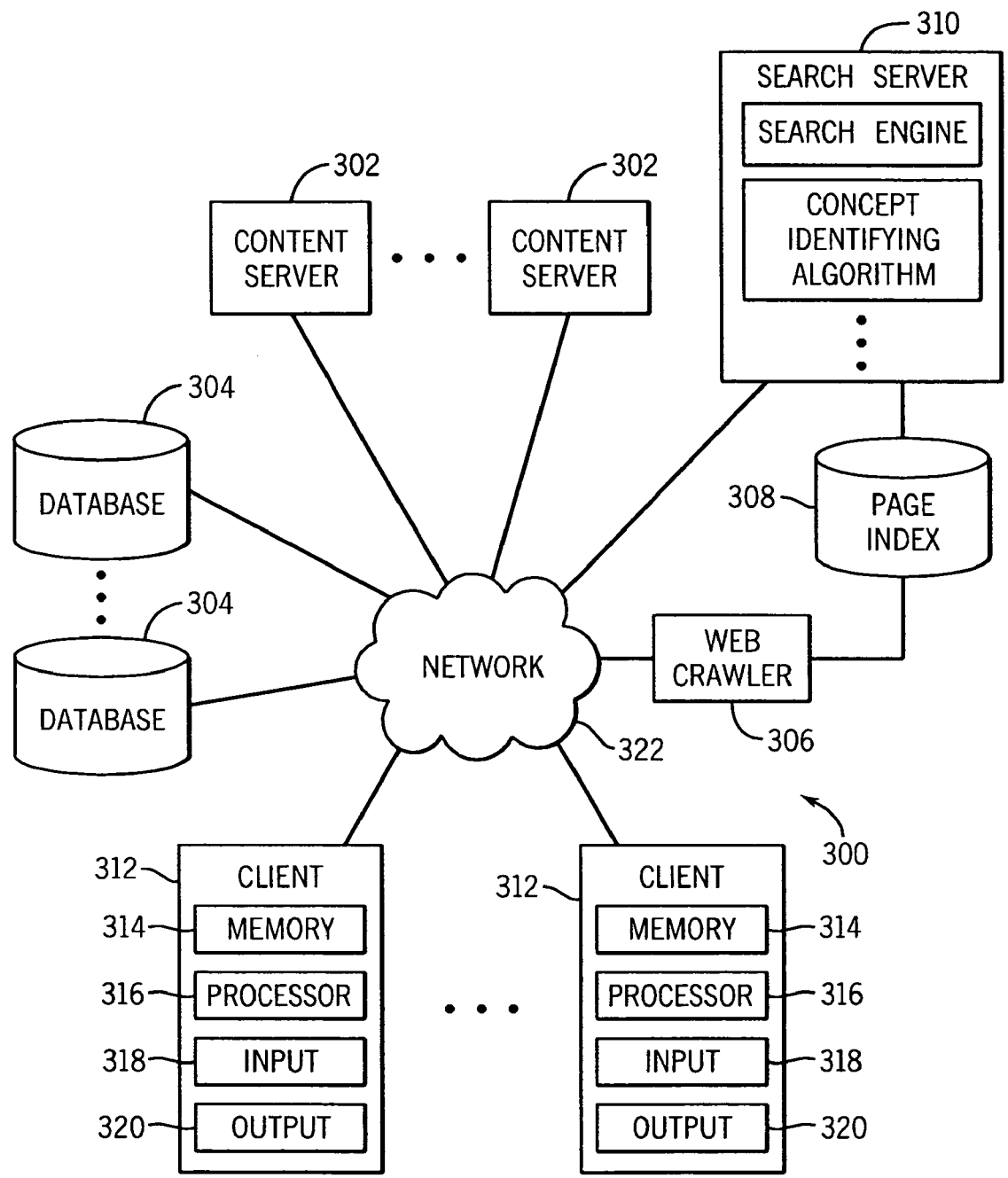
FIG. 3 illustrates a block diagram of one embodiment of a system for providing conceptual search results.

Referring to FIG. 3, a block diagram of one embodiment of a system 300 for presenting search results by visually illustrating concepts is shown. The system 300 includes a plurality of content servers 302, a plurality of databases 304, a web crawler 306, a page index database 308, a search server 310, a plurality of clients 312, and a communications network 322. Each of the servers 302, databases 304, web crawler 306, search server 310, and clients 312 is in communication with the network 322. Each of the servers 302, databases 304, web crawler 306, page index database 308, search server 310, and clients 312 can be located at different locations relative to each other.

The servers 302 are host servers operable to provide content to clients 312 via the network 322. The servers 102 host web sites (or web pages) and include data and media content. The databases 304 are operable to store data associated with the servers 302, search server 310, and/or clients 312. For example, the databases 304 can include a database of images, advertisement data, and/or web page layouts or templates. The databases 304 can communicate with the servers 302, search server 310, web crawler 306, or clients 312 via the network 108.

Alternatively, the servers 302 may include the databases 304, processors, switches, routers, interfaces, and other components and modules. There may be more or less than two servers 302, depending on computational and/or distributed computing requirements. The servers 302 may be located at different locations relative to each other. The databases 304 may also be directly connected to the servers 302. There may be more or less than two databases 304, depending on computational and/or distributed computing requirements.

In one embodiment, the web crawler 306 (also referred to as a spider, bot, or crawler) includes algorithms to classify (and rank) every page or representative pages on searchable web sites. The web crawler 306 is configured for manual, semi-automatic, or automatic "reading" of the pages. The pages "read" by the web crawler 306 are cataloged into one or more page indexes, such as the page index database 308. The page index database 308 includes pages, hypertext links to pages, data representing content of indexed pages, etc.

The search server 310 is operable to carry out search requests initiated by users and provide search results formatted by visually illustrating concepts to the clients 312. The search server 310 includes various modules, programs, algorithms, and/or units for executing the search requests, including, but not limited to, a search engine (also referred to as query response module or program), concept identification module or algorithm, and content and source identification module or algorithm. The search server 310 can also include a database of images, advertisement data, and/or web page layouts or templates for use in providing the search results.

When the search server 310 receives a search request from any of the clients 312, the search server 3 10 (e.g., in particular, the search engine) provides search related algorithms for identifying and ranking web pages relative to the entered query or search terms. The search server 310 interfaces with the page index database 308 to identify which pages or content associated with pages will comprise the initial search results. The search server 310 includes a ranking algorithm to rank the identified search results.

Although the search server 310, web crawler 306, and page index database 308 are illustrated in FIG. 3 as separate components, in an alternative embodiment the search server 310, web crawler 306, and page index database 308 may be implemented as a single component or system. For example, the search engine can comprise a coordinated set of programs that includes a spider program, a program that generates a page index, and a program that returns search results in response to a search request. The spider program "reads" every page or representative pages at searchable web sites. The indexing program that generates an index from the pages "read" by the spider program. The program that returns search results compares the search request to entries in the index to identify the most relevant matches and possibly also ranks the identified matches.

Each of the clients 312 (also referred to as client devices) includes a memory 314, a processing unit 316, an input device 318, and/or an output device 320. The clients 312 may be a general purpose computer (e.g., a personal computer). Other computer system configurations, including Internet appliances, hand-held devices, wireless devices, portable devices, wearable computers, cellular or mobile phones, portable digital assistants (PDAs), multi-processor systems., microprocessor-based or programmable consumer electronics, set-top boxes, network PCs, mini-computers, and the like may also be implemented as the clients 312. The clients 312 include one or more applications, program modules, and/or sub-routines. As an example, the clients 312 may include a browser application (e.g., Internet Explorer, Firefox, etc.) and a graphical user interface (GUI) to access pages and data provided by the servers 302, databases 304, and search server 310. The system 300 may include more or less than two clients 312. The clients 312 may be remote from each other, the servers 302, databases 304, and/or search server 310. The clients 312 may be wireless devices.

The network 322 is a communications network, such as a local area network (LAN), a wide area network (WAN), or the Internet. When the network 322 is a public network, security features (e.g., VPN/SSL secure transport) may be included to ensure authorized access within the system 300.

Figure 4:
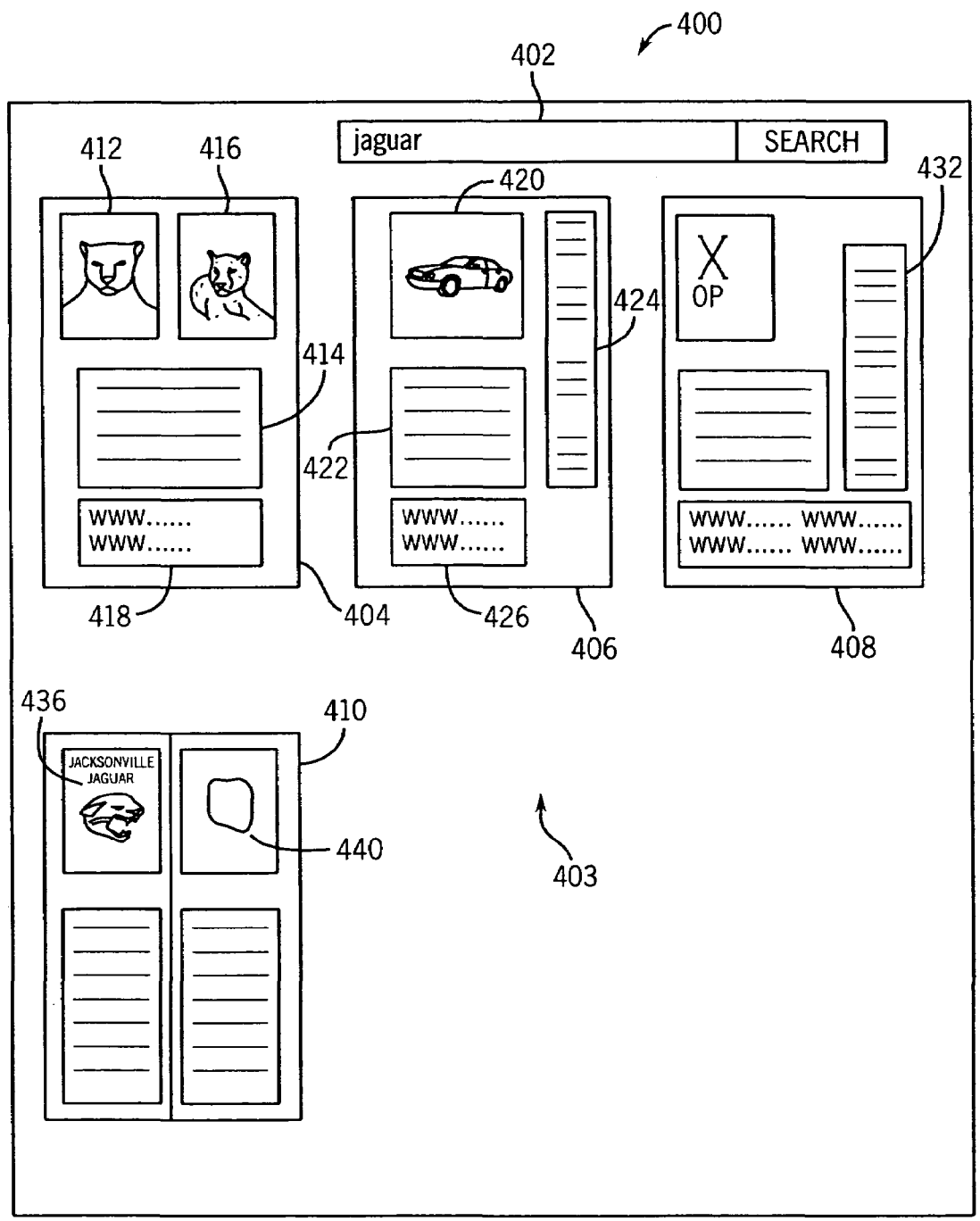
FIG. 4 illustrates one embodiment of a conceptual search results generated by the system of FIG. 3.

Referring to FIG. 4, one embodiment of a search results page 400 presented in the visually illustrating concepts format is shown. The search results page 400 includes a search parameter field box 402 and final search results 403. The final search results 403 are in response to a search request based on the search parameter "jaguar" entered into the search parameter field box 402. The final search results 403 comprise four "entries"—a first concept 404, a second concept 406, a third concept 408, and a fourth concept 410. (There may be less or more than four concepts depending on the search parameter.) Each of the concepts 404, 406, 408, 410 includes at least one graphical or image element (or visual content) and at least one textual element (or textual content) relating to its respective concept. For example, the concepts 404, 406, 408, and 410 for the search parameter "jaguar" comprise an animal, car, operating system, and sports team concept, respectively.

Figure 5:
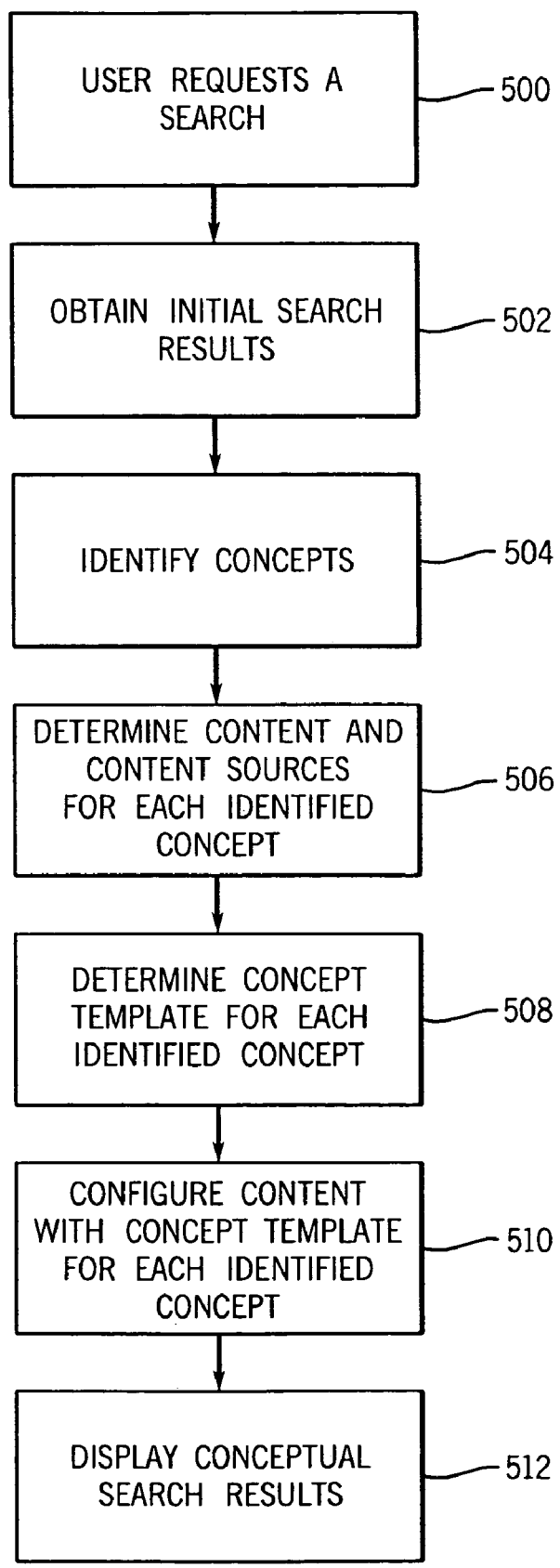
FIG. 5 is a flow diagram of one embodiment of a conceptual search results generation functionality implemented in the system of FIG. 3.

Referring to FIG. 5, a flow diagram illustrating one embodiment for presentation of search results by visually illustrating concepts is shown. The flow diagram includes a search request block 500, an obtain initial search results block 502, an identify concepts blocks 504, a determine content and sources for each identified concepts block 506, a determine concept template for each identified concepts block 508, a configure template with content block 510, and a display final search results in dynamic conceptual format block 512.

At the block 500, the user requests a search (or initiates a query) at a search engine (to the search server 310) accessed using a browser application included in the client 312. The browser application can include and/or be associated with a GUI. The search engine can be accessed by specifying an URL (e.g., yahoo.com). When the page associated with the specified search engine URL is displayed at the client 312, the user enters search terms (also referred to as search parameters, keywords, or query) at a search field box of the displayed page.

It is contemplated that the search request can alternatively be initiated from non-browser applications, such as, but not limited to, a toolbar, pop-up window, drop-down window, intranet site, etc. The search request also need not be entered into a search box. Instead, the search terms may comprise text within a web page and the web page may include the ability to initiate a search using text from within the web page (e.g., user clicking on a search tab next to certain terms).

Once the user has entered search parameters, the search engine at the search server 310 performs a search using the entered search parameters (block 502). The search engine determines a list of web pages, URLs, and/or content associated with URLs that satisfies the matching criteria relative to the search parameters. This list of web pages, URLs, and/or content associated with URLs is referred as the initial search results. An example of initial search results may be the search results 100. However, the initial search results are not provided or otherwise displayed to the user. The initial search results serve as intermediate data to determine final search results.

In some embodiments, determination of concepts can be initiated as soon as the user starts to specify the search terms. For example, the user may start typing search terms and before he has finished typing and/or hits the search button, the system may initiate block 502. Depending on the user's typing speed and/or system's processing speed, visually illustrating concepts corresponding to the partially typed search terms may be presented to the user before he has fully entered the search terms. Once the search terms are fully specified, another set of visually illustrating concepts corresponding to the fully specified search terms can be subsequently provided.

Next at the block 504, the concepts identifying algorithm included in the search server 310 identifies the common and minority concepts in the initial search results. For example, a search conducted using the search parameter "jaguar" provides initial search results that includes "hits" for more than one concept or usage of "jaguar." Concepts include "jaguar" the animal, "jaguar" the car, "jaguar" the operating system, "jaguar" the professional football team, etc. Continuing the example, it can be seen that each of the search results entries in FIGS. 1A-1B can be categorized within the car, animal, or professional football team concepts. Additional search results entries in subsequent pages for the search of FIGS. 1A-1B will provide additional concepts, such as the operating system concept. Alternatively, the block 502 may be omitted and the block 504 may be performed using the search parameter.

Concepts (also referred to as context, usage, cluster, groups, or categories) associated with the search parameter are identified to make the voluminous amount of initial search results manageable and comprehensible without requiring the user to skim through all of the initial search results. As FIGS. 1A-1B illustrate, the listing of search results for the search parameter "jaguar" extends more than ten pages (see a results page count indicator 104). Instead, the initial search results entries (or hits that would comprise the initial search results entries if the initial search results entries are expressly configured), which may potentially be a large number of entries, are grouped and most relevant content extracted therefrom to construct a small number of conceptual search results entries.

The concepts identifying algorithm is configured to determine major and minor concepts in response to the user specified search parameter. In one embodiment the algorithm includes a database of concepts and associated words, and the initial search results are compared against the database to identify the various concepts for that search parameter. In another embodiment the algorithm identifies similar words that appear in the initial search results to construct the applicable concepts. For example, looking at the search results entries 100 in FIGS. 1A-1B, terms such as "animal" or "cat" appear in entries relating to "jaguar" the animal concept, and terms such as "car," "models," "automobiles," "vehicles" or prices appear in entries relating to "jaguar" the car concept. Jaguar the car concept and jaguar the animal may be major concepts (e.g., these search results appear on the first search results page), while Jaguar the operating system or Jaguar the sports team may be minor concepts (e.g., these search results appear in later search result pages). It is contemplated that various other concepts identifying algorithms can be implemented in the system 300 to identify concepts within the initial search results. The determination of concepts can occur on-the-fly in response to the initial search results.

One alternative to blocks 502 and/or 504 discussed above is to identify concepts (block 504) in order to obtain initial search results (block 502). The concepts identifying algorithm (including a database of concepts and associated words) is utilized to identify one or more concepts for the entered search parameter. The identified concepts and the search parameter are then used to run one or more initial searches to obtain more relevant initial search results than using just the search parameter. The concepts identifying algorithm (also referred to as an entity engine) figures out additional terms that are likely to appear with the search parameter. Sets of terms or clusters of words that meaningfully fit together to specify an entity or concept are specified relative to the search parameter. For example, if the person types in "san" as the search parameter, then the meaningful cluster entities or concepts may be "San Francisco" and "San Diego." As another example, if the person types in "San Francisco," the output may be "San Francisco restaurants," "San Francisco sights," "San Francisco Giants," "San Francisco maps," "San Francisco history," etc. These meaningful cluster entities or concepts are used to run initial searches.

As another alternative to blocks 502 and 504 discussed above, the concepts identifying algorithm (e.g., via a database of concepts and associated terms) can be sufficient to identify concepts associated with the search parameter. For example, if "jaguar" is the search parameter, the associated concepts may be "animal," "car," "operating system," and "Jacksonville sports team."

Once the concepts have been determined, the content to be displayed for each of the identified concepts is determined in the block 506. The content (and the sources from which to extract the content) is tailored for a given concept. Sources and content used for a given concept are a function of the identified concept. The sources from which to extract content can be virtually limitless. Sources can include, but are not limited to, news, advertisement, images databases, information databases, and web sites. Content from a plurality of sources are pulled together for a given concept.

In one embodiment, the sources and/or the content extracted from the sources do not necessarily have any explicit tie-in or mapping between them. There is no central location or otherwise mapping scheme that contains all of the content used to configure any identified concept. As an example, in the search results shown in FIG. 2, the image 200, file name 202, size information 204, and URL 206 elements comprising the first search results entry come from the same source (e.g., a common URL) and already exist mapped together prior to configuration as the first search results entry. In contrast, the various content, objects, or elements comprising each of the search results entries in the concepts format are selected on-the-fly in response to the search parameter.

Alternatively, it is also contemplated that the sources and/or content to extract from the sources can be identified ahead of time for each given concept. This may be useful to decrease wait time in presenting concepts based search results and/or to compensate for equipment limitations (e.g., present processor times, amount of network traffic, system bandwidth, number of persons simultaneously requesting searches, etc.). When such a mapping is pre-determined, a database may include the mapping and also the required content to generate the concepts based search results.

To determine which sources and/or content to use, factors such as user behavior (e.g., users' click through of particular search results entries from same or similar search parameters), ranking of initial search results entries for a given concept, type of content, size constraints, default selection of relevant sources, type of concept, etc. are taken into account. Past behavior of the user requesting the search can be tracked via tracking information associated with his user profile. Past behavior of a plurality of users can be tracked and analyzed. Over time, the identified concepts, content for the identified concepts, sources of the content, display order of the identified concepts, etc. can change due to cumulative information gathered from user behavior, even if the same search parameters are entered.

Moreover, the particular person requesting a search can specify explicit user preferences and settings. For example, if the person pre-declares that he would like only non-commercial search results, commercial concepts identified from his entered search parameter would be excluded in the displayed concepts based search results.

Figure 6:
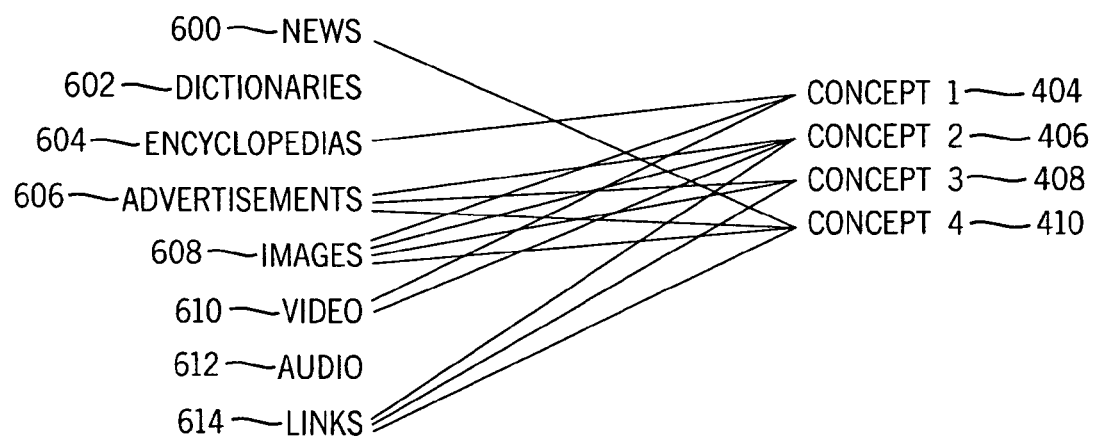
FIG. 6 illustrates example content and sources used to configure each of the conceptual search results entry in response to a query request.

Continuing the example, some of the possible sources and type of content for the four concepts 404, 406, 408, 410 are shown in FIG. 6. For the first concept 404 (e.g., "jaguar" the animal), encyclopedias 604, images 608, and video 610 are deemed to be the best fit or pairing of multi-media content with descriptive data. For the second concept 406 (e.g., "jaguar" the car), advertisements 606, images 608, videos 610, and URLs 614 are deemed to be the best pairings. For the third concept 408 (e.g., "jaguar" the operating system), advertisements 606, images 608, and URLs 614 are deemed to be the best pairings. For the fourth concept 410 (e.g., "jaguar" the sports team), news 600, advertisements 606, images 608, and URLs 614 are deemed to be the best pairings. Notice that certain concepts (e.g., cars or operating systems) are suited for certain types of content (e.g., advertisement and pricing elements), whereas inclusion of those types of content for other concepts (e.g., animals) is less suitable. Each of sources and/or content 600-614 can be from indexed web pages/sites/content and/or dedicated databases (e.g., proprietary dictionaries).

With the sources and content for each identified concept determined, an appropriate template for each of the identified concepts is also determined (block 508). The templates for the different concepts within a particular search can be the same or different from each other. The chosen template depends on the identified concept and the content that will populate the template. The template, sources, and content selection for a given concept are selected independently of other concepts (for a particular search and across different searches). The templates (or web page layout) can be provided from the search server 310 and/or databases 304. As will be discussed in detail below, the chosen template specifies the position, location, size, etc. of each of the elements to be displayed for each concept.

Next, at the block 510, the final search results page is configured using the chosen template and content for each identified concept. Lastly, the final search results are displayed at the GUI at the client 312 (block 512) (e.g., search results page 400).

It is contemplated that one or more of the blocks 500-512 may occur simultaneously or in different order than described above. For example, determining the concepts (block 504), determining the sources and content (block 506), and determining the templates (block 506) may be performed simultaneously or in different order relative to each other. Although not discussed, there may be additional processes, components, and/or algorithms accessed to generate the final search results using visually illustrative concepts.

In one embodiment, the search results presented in visually illustrative concepts are configured to aid the user to rapidly indicate to the system what aspect of the search terms that he/she is actually interested in. Rather than requiring the user to skim through pages of search results (such as shown in each of FIGS. 1 and 2), a potentially large number of initial search results entries are dynamically grouped, collapsed, and selective content extracted to generate final search results on a conceptual basis. The user is presented with a smart aggregation of results. Each of the displayed search results entry (also referred to a conceptual search results entry, conceptual entry, clustered entry, or concept based entry) comprises content from more than one disparate sources.

Each of the conceptual entries is configured to provide a wealth of relevant information organized for quick recognition and comprehension by the user. A simple metaphor for the level of information compactness and relevance is a baseball card. A baseball card typically includes an image of a baseball player and his name on the front side, and the player's basic statistics throughout his baseball career on the back side (e.g., height, weight, draft pick, position, date of birth, home town, years played, team name, batting record, any special records, etc.).

Turning to the search results page 400 of FIG. 4, conceptual entries are described in greater detail with respect to the "jaguar" search parameter. Each of the conceptual entries includes at least one image or picture (multi-media content) and data relating to the image (or concept) arranged in a range of different visualizations. The content within each conceptual entries comes from at least two different sources. The number of content elements (also referred to as subpanels) for a conceptual entry is variable. The number of subcategories (e.g., image, text, hyperlinks, advertisements, etc.) of content within a given conceptual entry is variable. A content element can comprise data from more than one source (e.g., a plurality of addresses to different web sites within a link element).

The concept 404 includes a first image element 412, a textual element 414, a second image element 416, and a link element 418. The first image element 412 can be the image extracted from the first "hit" in the initial search results pertaining to "jaguar" the animal. For example, the first image element 412 may be the image 200 in FIG. 2. The textual element 414 can be descriptive text relating to the "jaguar" the animal concept. The textual element 414 aids in confirmation of the visual data provided by the first image element 412. The second image element 416 can be another image relating to the "jaguar" the animal concept. For example, if jaguars exist in two distinct varieties, they may be visually shown respectively in the first and second image elements 412, 416. Conversely, if one image will be sufficient, then second image element 416 may not be required. As discussed above, the concept template and subpanels are dependent on the particular concept and identified relevant content that best express the concept. Lastly, the link element 418 can be one or more URLs relating to "jaguar" the animal concept. The content of each of the elements 314-418 can come from different sources from each other. For example, the first image element 412 may be provided by defenders.org, the textual element 414 provided by an on-line encyclopedia such as wikipedia-.com, the second image element 416 provided by bluelion-.org, and the link element 418 provided by other animal web sites.

The concept 406 includes an image element 420, a textual element 422, an advertisement element 424, and a link element 426. The image element 420 can be an image of a Jaguar car (e.g., from jaguar.com). The textual element 422 can be description relating to the image element 420, but provided from carenthusiast.com. The advertisement element 424 can comprise one or more URLs to purchase Jaguar cars or accessories (e.g., car dealers or importers). The link element 426 can be one or more URLs to obtain further details about Jaguar cars.

One advantage of smart aggregation of search results by concepts is that focused advertisement can be presented. In FIGS. 1A-1B, the advertisements 102 are all directed to Jaguar cars. However, the user may actually be interested in "jaguar" the operating system. But because none of the advertisements 102 is for the operating system, a potential advertiser lost the opportunity for a click-through and product purchase. Advertisers would also be willing to pay more if the relevancy of their ad placement can be assured. In FIG. 4, the advertisement element 424 is directed to Jaguar cars while an advertisement element 432 for the concept 408 is focused on the operating system. Advertisement elements can comprise, but are not limited to, links to web sites, price lists, coupons or special promotion notification, sponsored sites, etc. Advertisement elements can comprise a variety of data that a third party is willing to pay to have included in the search results page 400. If advertisements relating to a concept are non-existent or not relevant enough, advertisement elements may be excluded from the displayed concept entry (e.g., the concept 404 does not include advertisements). Advertisement comprises third party paid content.

Lastly, the concept 410 can include a static image 436 and video 440 (e.g., two image elements) to provide visualization of the "jaguar" sports team and two textual elements.

Concepts are determined from the sources and/or content from which the search is performed. If the network comprises an intranet, the search is performed from the intranet sources and/or content. If the network comprises the Internet, the search is performed from sources and/or content available on at least the World Wide Web.

Concepts are identified for a given query term based on more than matches to the query term or dissimilarity in terms between hits. Identified concepts comprise understanding of abstracted contextual or usages associated with the query term so that hits can be logically clustered. For example, if a relatively narrow query term for a product is entered (e.g., "ipod nano"), each different configuration of the iPod nano (e.g., different configurations based on color, memory size, engraving potential, etc.) would not be considered as a separate concept. Instead, concepts are likely to be, but not limited to, the device itself (models, features, etc.), reviews, accessories, how to use instructions, purchase information (prices, sellers, etc.), and downloadable content information (music, video, etc.). Thus, concept identification is not based on word match, relatively high correlation, or correlation with at least a part of the query term. The concept(s) are determined from knowledge of the context in which the query terms have been and may be used.

Images can include a variety of concept visualizations, such as, but not limited to, pictures, photos, drawings, animation, graphics, logos, video, audio, multi-media content, or thumbnails of multi-media content. Textual content can include a variety of alpha-numeric indices, such as, but not limited to, hyperlinks, excerpts, text, or advertisements. For a given concept, one or more such content may be selected as best suits the concept. For example, video may be better suited to convey motion such as how to make coffee based on the search term "java" (for the "java" the coffee concept). Audio may be better suited to convey a song, for example, the search term "imagine." In cases where a generic icon or image can be used or cannot be found from the initial search results, such icon or image can be obtained from the image database at the search server 310 and/or databases 304. As an example, the audio visualization may be an icon of a musical note.

In any case, the concepts 404, 406, 408, 410 shown in FIG. 4 are examples of the variety of content and layouts possible in displaying the conceptual search results. These and other combinations are possible in accordance with the relevant content and concepts. Thus, the search results for the search term "jaguar" can be displayed on a single page, and the user can quickly review the images and accompanying text to specify his actual interest or determine appropriate narrower query terms (e.g., rapid disambiguation).

When the user has identified the concept of interest, the search results page 400 permits user interactivity. If the user clicks on any of the content or subpanels within a given concept (e.g., any of elements 412, 414, 416, or 418), the system 300 responds with one or more actions. Actions can include, but are not limited to, presenting the user with the source site or page associated with the clicked element, automatically running a new search with narrower terms based on the clicked element or concept, or presenting another conceptual results page that is narrowed to the particular clicked element or concept and provides more in-depth information than is provided in the search results page 400.

For example, if the user clicks on the image element 412, the user is presented with the source web site or web page from which the image was obtained. If the user clicks on the textual element 414, the system performs another search with narrower search terms than those used to provide the original conceptual search results. If the search term is "java," and the conceptual search results comprise Java the coffee and java the program language, then expressing interest in the coffee concept provides the user with an in-depth coffee page that is configured on-the-fly. This in-depth page can include additional concepts relating to how to make coffee, how to buy coffee, different types of coffee beans, where coffee is grown, etc.

Figure 7:
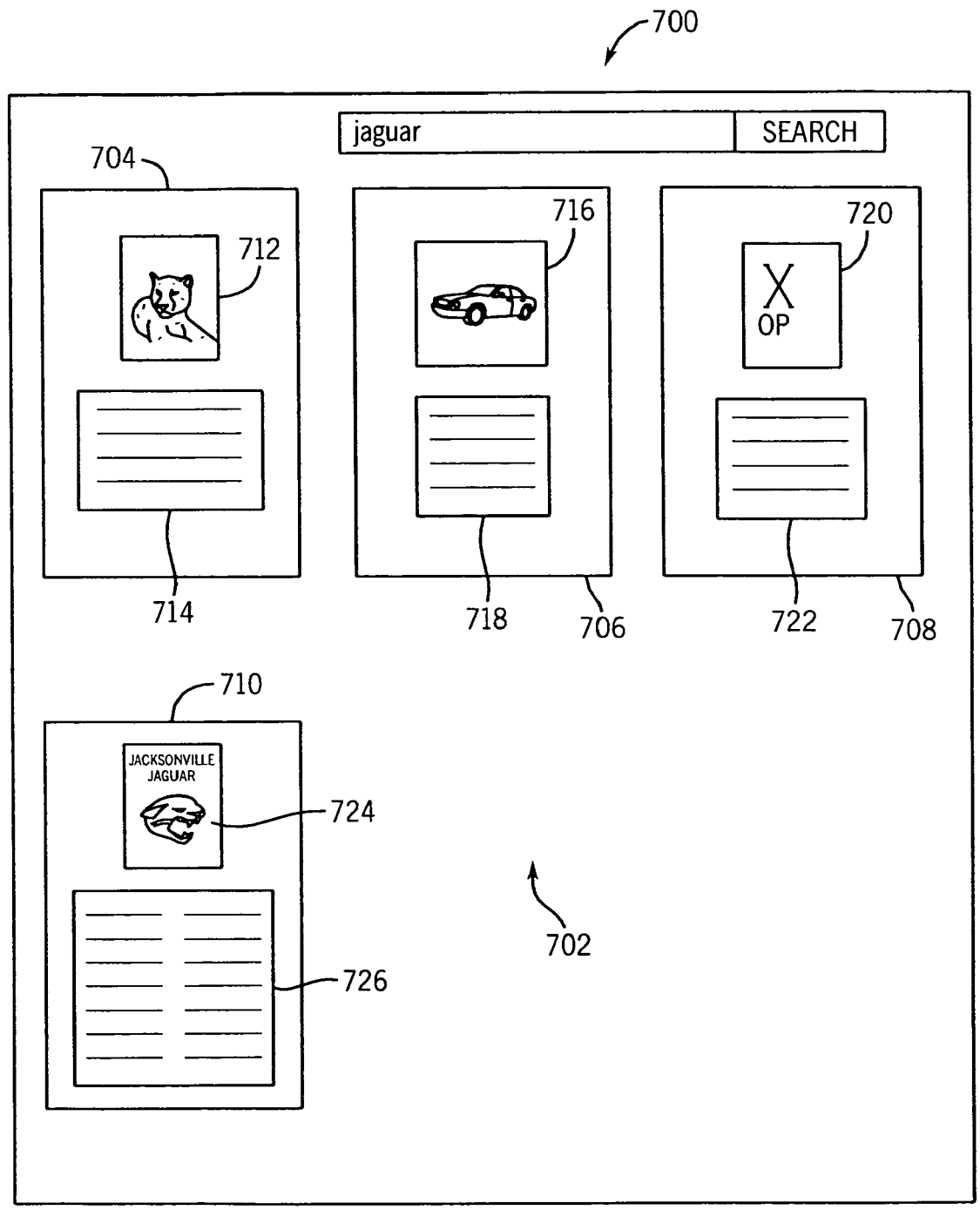
FIG. 7 illustrates another embodiment of a conceptual search results generated by the system of FIG. 3

Referring to FIG. 7, another embodiment of a search results page 700 is shown. The search results page 700 is configured for rapid disambiguation (rather than interactivity). Continuing the "jaguar" search term example, a search results 702 comprise four "entries" similar to FIG. 4 (a first concept 704, a second concept 706, a third concept 708, and a fourth concept 710). However, unlike FIG. 4, each of concepts 704-710 is conveyed with minimal amount of content for quick identification of the respective concepts by the user.

Each of concepts 704-710 includes a visual element (static or animated picture) and a textual element relating to the visual element. The visual and textual element for a given concept can be from the same or different sources. The first concept 704 is directed to jaguar the animal, and includes a picture 712 of a jaguar cat and a text 714 relating to a jaguar cat. The second concept 706 is directed to jaguar the car, and includes a picture 716 of a jaguar automobile and a text 718 about the jaguar automobile. The third concept 708 is directed to jaguar the operating system, and includes a picture 720 and a text 722 directed to jaguar the operating system. The fourth concept 710 is directed to jaguar the sports team, and includes a picture 724 and a text 726 directed to jaguar the sports team. The amount of content, source(s) of the content, and layout of the content for each concept may be specified as discussed above for blocks 506 and 508 of FIG. 5.

Concepts 704-710 are presented with enough information for the user to quickly comprehend each of the majority and minority concepts associated with the search term, but not too much information such that the user is distracted from the disambiguation function. For example, upon presentation of the search results page 700, the user can quickly comprehend that "jaguar" can be an animal, automobile, operating system, or sports team. Hence, the user can rapidly determine which use of "jaguar" he actually wanted and proceed accordingly. In a sense, visually illustrated concepts is a way to focus search terms.

The user interacting within (and/or proximate) the display area of any one of the concepts 704-710 causes the same next event. In other words, clicking on the picture 712, text 714, or the empty space within the display area of the concept 704 causes the same next action. The next action can be another search results page with (more focused) visually illustrated concepts or a search results page with URL-type listing search results for the selected concept. For example, if the user clicked on the concept 706, then sub-concepts directed to jaguar the car may comprise jaguar car models, jaguar car purchase information, jaguar car specifications, jaguar car history, jaguar car accessories, etc. On the other hand, if the selected concept itself does not have more than one sub-concepts, then a listing of URLs with associated short excerpted description directed to the selected concept (similar to FIGS. 1A-1B) may be the next event in response to selection of a displayed concept.

In yet another embodiment, the search results page displaying visually illustrating concepts is configured to facilitate varying degrees of rapid disambiguation vs. interactivity. If rapid disambiguation is a higher priority than interactivity but some interactivity is preferred, then each of the concepts can present fewer elements than shown in FIG. 4, but perhaps still permit clicking on different elements within a given concept to lead to different source URLs. If interactivity is a higher priority than rapid disambiguation but some rapid disambiguation is preferred, then the number and/or variety of elements displayed for each concept may be in between those shown in FIGS. 4 and 7.

In this manner, a system and method for generating conceptual search results is disclosed herein. In response to a search request, the system determines various concepts or usage associated with the query term. For each identified concept, (most) relevant content from a variety of sources pertaining to the concept are extracted to configure a conceptual search results entry. The extracted content comprises multi-media content (e.g., some form of pictorial indicia) and textual content. The extracted content can also comprise advertisement, hyperlinks, and/or other types of data. Each of the conceptual search results entries comprising a given conceptual search results is configured independently of each other.

Accordingly, the result returned to the user comprises a discrete and manageable number of concepts, each concept represented as a package of multi-modal, multi-media content. This "best fit" pairing of at least one visual element with at least one textual element for each identified concept facilitates rapid disambiguation by the user. Identification of concepts, aggregation and selection of content, selection of subcategories of content for a concept, selection of conceptual template for each concept, and order of the conceptual search results entries are performed dynamically in response to the search request.

It will be appreciated that the above description for clarity has described embodiments of the invention with reference to different functional units. However, it will be apparent that any suitable distribution of functionality between different functional units may be used without detracting from the invention. Hence, references to specific functional units are only to be seen as references to suitable means for providing the described functionality rather than indicative of a strict logical or physical structure or organization.

The invention can be implemented in any suitable form including hardware, software, firmware or any combination thereof. Different aspects of the invention may be implemented at least partly as computer software or firmware running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

The terms "computer program product," "computer-readable medium," and the like may be used generally to refer to media such as, for example, databases 304, page index 308, or memory 314. These and other forms of computer-readable media may be involved in storing one or more sequences of one or more instructions for use by content server 302, search server 310, web crawler 306, or processor 316, to perform specified operations. Such instructions, generally referred to as "computer program code" (which may be grouped into the form of computer programs or other groupings), when executed, enable the system 300 to perform features or functions of embodiments of the present invention. Note that the code may directly cause the processor to perform specified operations, be compiled to do so, and/or be combined with other software, hardware, and/or firmware elements to do so.

Moreover, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed:

1. A computer-implemented method for providing search results, the method comprising:
    receiving a query term;
    determining contextual usages of the query term; and
    providing as the search results a search result entry for each of the determined contextual usages, the search result entry comprising at least one image content and at least one textual content.

2. The method of claim 1, wherein the image content and the textual content for each of the search result entries are obtained from different sources.

3. The method of claim 1, wherein the image content and the textual content for each of the search result entries are obtained from the same source.

4. The method of claim 1, wherein the image content and textual content have no pre-existing mapping with each other.

5. The method of claim 1, wherein the image content is selected from a group consisting of a picture, photo, drawing, animation, graphics, logos, video, audio, multi-media content, and thumbnail.

6. The method of claim 1, wherein the textual content is selected from a group consisting of a hyperlink, excerpts, and text.

7. The method of claim 1, further comprising identifying at least a first content from a first source and a second content from a second source for each of the determined contextual usages.

8. The method of claim 1, wherein determining contextual usages and providing the search results entry are performed on-the-fly.

9. The method of claim 1, wherein the determined contextual usages are not associated with price.

10. The method of claim 1, further comprising providing a focused search result page associated with one of the search result entries based on interest in one of the search result entries, wherein the focused search result page comprises at least a listing of URL addresses containing content relevant to the determined contextual usage associated with the search result entry of interest.

11. The method of claim 1, further comprising providing a contextual based search result page for one of the search result entries, wherein an interest is expressed in one of the search result entries and the contextual based search result page comprises one or more contextual uses relating to the search result entry of interest.

12. A computer program product for generating conceptual search results to a client device, comprising:
    a memory storing computer-executable code; and
    a processor in communication with the memory and operable to execute the computer-executable code to cause performance of:
    receiving a search parameter,
    determining at least one concept associated with the search parameter, and
    generating a conceptual based search result entry for the determined concept, wherein the conceptual based search result entry comprises indicia representative of the determined concept to facilitate rapid disambiguation of the determined concept.

13. The computer program product of claim 12, further comprising determining initial search results based on a match with at least a portion of the search parameter.

14. The computer program product of claim 13, wherein determining at least one concept comprises determining the concept by identifying the concept from the initial search results.

15. The computer program product of claim 12, wherein determining at least one concept comprises using a concepts database.

16. The computer program product of claim 12, wherein determining at least one concept comprises determining more than one concept, and generating a conceptual based search result entry for each of the determined concepts.

17. The computer program product of claim 12, wherein the conceptual based search result entry comprises first data from a first source and second data from a second source.

18. The computer program product of claim 17, wherein the first data comprises image data and the second data comprises text data.

19. A computer program product for facilitating user disambiguation of search results, comprising:

a memory storing computer-executable code; and a processor in communication with the memory and operable to execute the computer-executable code to cause performance of:

dynamically identifying at least one common concept in search result entries obtained by relevancy correlation to at least a portion of a query term, dynamically grouping the search result entries according to each identified common concept, identifying a portion of content included in each of the grouped search result entries, and dynamically constructing a conceptual search result entry for each of the grouped search result entries, wherein each of the conceptual search result entries includes the portion of content from its respective grouped search result entries.

20. The computer program product of claim 19, further comprising:

receiving indication of interest in one of the conceptual search result entries; and constructing a focused search results for the conceptual search result entry of interest, wherein the focused search results comprise search result entries for the identified common concept associated with the conceptual search result entry of interest.

21. The computer program product of claim 19, wherein dynamically identifying the common concept is not based on a word match with at least a portion of the query term.

22. The computer program product of claim 19, wherein each of the conceptual search result entries include multimedia, multi-modal content.

* * * * *